Patented May 16, 1950

2,507,521

UNITED STATES PATENT OFFICE 2,507,521

PRODUCTION OF ORGANOSILICON POLYMERS

Harold A. Clark, Midland, Mich., assignor to Dow Corning Corporation, Midland, Mich., a corporation of Michigan No Drawing. Application June 24, 1949, Serial No. 101,243. In Great Britain December 21, 1948

4 Claims. (Cl. 260—448.2)

The present invention relates to an improved process for the production of organosilicon polymers in which the silicon atoms are interconnected by methylene radicals.

Organosilicon compounds have been described in which silicon atoms are interconnected by methylene radicals. Typical compounds of this nature are 1,1,1,3,3,3, hexachloro 1,3, disilapropane ($Cl_3SiCH_2SiCl_3$) and 2,2,4,4, tetramethyl 2,4, disilapentane [$(CH_3)_3SiCH_2(CH_3)_3$]. The production particularly of higher polymers of this type by methods heretofore proposed, is laborious.

A principal object of the present invention is to provide improved methods for the production of organosilicon products in which the silicon atoms are interconnected by methylene radicals, and in which the remaining valences of said silicon atoms are satisfied by methyl radicals.

In accordance with the present invention, an organochlorosilane is reacted with the reaction product of aluminum and methylene chloride in liquid phase. By this procedure, products of the indicated type are produced.

Suitable organochlorosilanes which may be employed in the process of the present invention have the formulae, $(CH_3)_3SiCl$, $(CH_3)_2SiCl_2$ and $CH_3SiCl_3$.

While desirable products are produced from silanes of the type indicated, it is desirable also to employ the method hereof with mixtures of silanes which have the average formula $(CH_3)_nSiCl_{4-n}$ in which $n$ has an average value of from 1 to 3. Such silane mixtures in addition to including one or more silanes of the specific individual types stated may likewise contain silicon tetrachloride, ($SiCl_4$).

The silane is reacted in liquid phase with the complex which is formed by reacting metallic aluminum and methylene chloride ($CH_2Cl_2$). This complex is formed by contacting the methylene chloride with metallic aluminum particularly in the form of chips and turnings in order to increase the available surface for reaction with the methylene chloride. The metallic aluminum is preferably an alloy such as an aluminum-copper alloy containing principally aluminum. The methylene chloride is preferably reacted with the metallic aluminum with the former in liquid phase, as for example, by refluxing at atmospheric pressure the methylene chloride with aluminum turnings suspended in the refluxing mixture. The reaction between the silane and the complex occurs spontaneously without any special or unusual conditions being provided therefor. The temperature may, if desired, be maintained at or below the reflux temperature of the reaction mixture though in any event it is preferred to operate at temperatures below 200° C.

The present process would normally be expected to cause coupling of the carbon of the methylene chloride to two silicon atoms in place of the two chlorines on the two different silicon atoms and thereby produce methylene linkage between the two silicon atoms. Following this course of reaction, when the silane is trimethylchlorosilane the product would be 2,2,4,4, tetramethyl, 2,4, disilapentane. This would not be subject to further linking by the aluminum chloride complex. This result is not in accord with the facts inasmuch as higher polymers are obtained which polymers contain a plurality of silicon atoms greater than two linked in pairs by methylene radicals.

Example 1

27 grams of turnings of an aluminum-copper alloy containing 8 per cent copper were placed in a reactor and 127.5 grams of methylene chloride was added. The reaction mixture was heated under reflux with stirring until the aluminum had been consumed by the formation of the complex of the two. The complex so formed was quite viscous. 325.5 grams of trimethylchlorosilane was added at room temperature. The mixture was heated to a temperature of 56 to 60° C. Reaction of the complex and the silane started immediately and the refluxing was continued until a considerable precipitate of aluminum chloride had formed. The liquid product was separated from the precipitated aluminum chloride and the former was poured onto cracked ice. The liquid product was washed until neutral, filtered and then distilled. A small proportion of the methylene chloride was recovered. Approximately half of the trimethylchlorosilane was recovered in the form of hexamethyldisiloxane. Tetramethylsilane formed during the course of the reaction likewise was recovered. 40 grams of higher boiling products were obtained. This residue was investigated by infrared spectroscopy. This material showed strong bands at 7.38 and 9.5 microns which show that the product contains methylene radicals each linked to two silicon atoms. There was also a band at 9.7 microns which showed that a compound was present in the reaction product which had a chlorine bonded to a carbon atom which in turn was bonded to silicon. The reaction product was distilled. By distillation, the following products were obtained.

$$(CH_3)_3Si[CH_2Si(CH_3)_2]_2CH_3$$
$$(CH_3)_3Si[CH_2Si(CH_3)_2]_3CH_3$$

There was also obtained a nonvolatile residue of high molecular weight polymers of the type of these two compounds. A volatile material was obtained boiling between the two indicated compounds which was crystalline and which contained the indicated chlorine bonded to carbon which in turn is bonded to silicon.

Example 2

60 grams of turnings of an aluminum-copper alloy containing 8 per cent copper were placed in a reactor and 127.5 grams of methylene chloride were added. A few crystals of iodine were then added as a catalyst. The reaction mixture was added under reflux with stirring until the aluminum had been consumed. This mixture was stirred in a water bath at 35° C. over night. The complex formed and obtained considerable viscosity. 193.5 grams of $(CH_3)_2SiCl_2$ were then gradually added. Reaction of the mixture was noted by the formation of aluminum chloride. The reaction mixture was stirred for a period of 2 weeks. The product was then filtered and the filter cake washed with an additional 100 grams of $(CH_3)_2SiCl_2$. A precipitate was formed which was identified as aluminum chloride. Distillation of the filtrate yielded unreacted methylene chloride, $(CH_3)_2SiCl_2$, and $(CH_3)_3SiCl$. A residue boiling above 150° C. was obtained. This residue was identified as a methylene polymer in which the silicon atoms are interconnected by methylene radicals, and in which the remaining valences of said silicon atoms are satisfied by methyl radicals.

That which is claimed is:

1. The process which comprises reacting in liquid phase an organochlorosilane having the formula $(CH_3)_nSiCl_{4-n}$, where $n$ has an average value of from 1 to 3, with the complex formed by reacting metallic aluminum with methylene chloride, whereby there is produced an organosilicon polymer in which the silicon atoms are interconnected by methylene radicals and in which the remaining valences of said silicon atoms are satisfied by methyl radicals.

2. The process in accord with claim 1 where $n$ has an average of from 2 to 3 inclusive.

3. The process in accord with claim 1 where $n$ has an average value of 2.

4. The process in accord with claim 1 where $n$ has an average value of 3.

HAROLD A. CLARK.

No references cited.